(12) United States Patent
Kang et al.

(10) Patent No.: US 8,959,267 B2
(45) Date of Patent: Feb. 17, 2015

(54) CONTROLLING AN EXTERNAL DEVICE CONNECTED TO USER EQUIPMENT

(75) Inventors: You-Jin Kang, Seoul (KR); Shin-Hyuk Kang, Seoul (KR); Kyeong-Sik Park, Gyeonggi-do (KR); Jung-Wook Lee, Gyeonggi-do (KR); Jae-Hun Jung, Gyeonggi-do (KR); Jae-Uk Cha, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/539,929

(22) Filed: Jul. 2, 2012

(65) Prior Publication Data

US 2013/0007307 A1    Jan. 3, 2013

(30) Foreign Application Priority Data

Jun. 30, 2011   (KR) ..................... 10-2011-0065137

(51) Int. Cl.
G06F 13/12 (2006.01)
G06F 13/14 (2006.01)

(52) U.S. Cl.
CPC ..................................... *G06F 13/14* (2013.01)
USPC .................. 710/72; 710/2; 710/8; 710/62

(58) Field of Classification Search
None
See application file for complete search history.

(56) References Cited

U.S. PATENT DOCUMENTS

| | | | |
|---|---|---|---|
| 5,832,471 A | 11/1998 | Fukui | |
| 5,875,312 A | 2/1999 | Walsh et al. | |
| 6,286,066 B1 | 9/2001 | Hayes et al. | |
| 6,401,157 B1 | 6/2002 | Nguyen et al. | |
| 6,516,367 B1 | 2/2003 | Barenys et al. | |
| 6,535,947 B1 * | 3/2003 | Amoni et al. | 710/305 |
| 6,600,840 B1 | 7/2003 | McCrossin et al. | |
| 6,697,892 B1 * | 2/2004 | Laity et al. | 710/72 |
| 6,804,740 B1 | 10/2004 | Watts, Jr. | |
| 6,862,724 B1 * | 3/2005 | Riley et al. | 326/39 |
| 6,915,368 B2 * | 7/2005 | Lin | 710/302 |
| 6,934,788 B2 * | 8/2005 | Laity et al. | 710/303 |
| 7,076,536 B2 * | 7/2006 | Chiloyan et al. | 709/220 |
| 7,117,388 B2 | 10/2006 | Arimilli et al. | |
| 7,165,109 B2 * | 1/2007 | Chiloyan et al. | 709/227 |
| 7,196,676 B2 | 3/2007 | Nakamura et al. | |
| 7,199,787 B2 | 4/2007 | Lee et al. | |
| 7,228,366 B2 * | 6/2007 | Abramson et al. | 710/19 |

(Continued)

FOREIGN PATENT DOCUMENTS

| | | |
|---|---|---|
| JP | 2000-163361 A | 6/2000 |
| JP | 2003-316563 A | 11/2003 |

(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.

*Primary Examiner* — Cheng-Yuan Tseng
(74) *Attorney, Agent, or Firm* — IP Legal Services, LLC

(57) ABSTRACT

Provided is a method for controlling and driving constituent elements of an external device connected to user equipment. The method may include obtaining external device information from the external device when coupled to the user equipment, obtaining application information based on the obtained external device information, and running an application tailored for the external device based on the obtained application information.

13 Claims, 10 Drawing Sheets

(56) References Cited

U.S. PATENT DOCUMENTS

| | | |
|---|---|---|
| 7,312,764 B2 | 12/2007 | Driver et al. |
| 7,386,868 B2 * | 6/2008 | McCormack ................ 720/657 |
| 7,533,408 B1 * | 5/2009 | Arnouse ........................ 726/9 |
| 7,685,322 B2 * | 3/2010 | Bhesania et al. ................. 710/8 |
| 7,853,944 B2 * | 12/2010 | Choe ........................ 717/173 |
| 7,884,836 B2 | 2/2011 | Hussain |
| 8,214,545 B2 * | 7/2012 | Khan et al. ................... 710/10 |
| 8,250,277 B2 | 8/2012 | Tseng et al. |
| 8,281,366 B1 | 10/2012 | McCorkendale et al. |
| 2002/0083228 A1 | 6/2002 | Chiloyan et al. |
| 2002/0121548 A1 | 9/2002 | Lu |
| 2003/0231143 A1 | 12/2003 | Nakamura et al. |
| 2004/0006690 A1 | 1/2004 | Du et al. |
| 2004/0160193 A1 | 8/2004 | Cha et al. |
| 2004/0210321 A1 * | 10/2004 | Hayashi et al. ................ 700/11 |
| 2004/0218036 A1 | 11/2004 | Boss et al. |
| 2004/0266425 A1 * | 12/2004 | Gonsalves et al. ......... 455/426.2 |
| 2005/0068252 A1 | 3/2005 | Driver et al. |
| 2005/0257052 A1 | 11/2005 | Asai et al. |
| 2006/0036788 A1 | 2/2006 | Galang et al. |
| 2006/0132473 A1 | 6/2006 | Fuller et al. |
| 2006/0190652 A1 | 8/2006 | Keely et al. |
| 2007/0077965 A1 | 4/2007 | Fox |
| 2007/0171239 A1 | 7/2007 | Hunt et al. |
| 2007/0257927 A1 | 11/2007 | Sakanishi et al. |
| 2008/0152305 A1 | 6/2008 | Ziegler |
| 2008/0303746 A1 | 12/2008 | Schlottmann et al. |
| 2009/0049554 A1 | 2/2009 | Vuong et al. |
| 2009/0109822 A1 | 4/2009 | Hung |
| 2009/0163139 A1 | 6/2009 | Wright-Riley |
| 2009/0178097 A1 | 7/2009 | Kim et al. |
| 2009/0231485 A1 | 9/2009 | Steinke |
| 2010/0064228 A1 | 3/2010 | Tsern |
| 2010/0064248 A1 | 3/2010 | Lee et al. |
| 2010/0066698 A1 | 3/2010 | Seo |
| 2010/0251243 A1 | 9/2010 | Gill et al. |
| 2010/0265652 A1 | 10/2010 | Agata et al. |
| 2010/0318709 A1 | 12/2010 | Bell et al. |
| 2011/0034242 A1 | 2/2011 | Aronzon et al. |
| 2011/0037711 A1 | 2/2011 | Siddiqui et al. |
| 2011/0102554 A1 | 5/2011 | Saito et al. |
| 2011/0134047 A1 | 6/2011 | Wigdor et al. |
| 2011/0138327 A1 | 6/2011 | Scott et al. |
| 2011/0202872 A1 | 8/2011 | Park |
| 2011/0275391 A1 | 11/2011 | Lee et al. |
| 2011/0285916 A1 | 11/2011 | Takiduka |
| 2011/0296308 A1 | 12/2011 | Yi |
| 2012/0050183 A1 | 3/2012 | Lee |
| 2012/0050331 A1 | 3/2012 | Kanda |
| 2012/0062479 A1 | 3/2012 | Feldstein et al. |
| 2012/0088548 A1 | 4/2012 | Yun et al. |
| 2012/0117167 A1 | 5/2012 | Sadja et al. |
| 2012/0155325 A1 | 6/2012 | Eichen et al. |
| 2012/0156954 A1 | 6/2012 | Eichen et al. |
| 2012/0172088 A1 | 7/2012 | Kirch et al. |
| 2012/0297207 A1 | 11/2012 | Carlsen et al. |
| 2013/0033414 A1 | 2/2013 | Zheng et al. |
| 2013/0089202 A1 | 4/2013 | Altmann |
| 2013/0104149 A1 | 4/2013 | Ahn et al. |
| 2014/0208276 A1 | 7/2014 | Park |

FOREIGN PATENT DOCUMENTS

| | | |
|---|---|---|
| JP | 2005-284657 A | 10/2005 |
| JP | 2006-094367 A | 4/2006 |
| JP | 2008-158342 A | 7/2008 |
| KR | 20-0290286 Y1 | 9/2002 |
| KR | 10-2004-0074759 A | 8/2004 |
| KR | 10-0487618 B1 | 5/2005 |
| KR | 10-2005-0096578 A | 10/2005 |
| KR | 10-2006-0018083 A | 2/2006 |
| KR | 10-2008-0027813 A | 3/2008 |
| KR | 10-2009-0092337 A | 8/2009 |
| KR | 10-2010-0032660 A | 3/2010 |
| KR | 10-2010-0039592 A | 4/2010 |
| KR | 10-2010-0108885 A | 10/2010 |
| KR | 20-2010-0009920 U | 10/2010 |
| KR | 10-2010-0128630 A | 12/2010 |
| KR | 10-2010-0133243 A | 12/2010 |
| KR | 10-2011-0030963 A | 3/2011 |
| KR | 10-1017866 B1 | 3/2011 |
| KR | 10-2011-0057930 A | 6/2011 |
| KR | 10-2011-0093541 A | 8/2011 |
| KR | 10-2011-0111857 A | 10/2011 |
| KR | 10-2011-0115489 A | 10/2011 |
| KR | 10-2011-0123348 A | 11/2011 |
| KR | 10-2011-0131439 A | 12/2011 |
| KR | 10-2011-0134495 A | 12/2011 |

* cited by examiner

CONTROLLING AN EXTERNAL DEVICE CONNECTED TO USER EQUIPMENT

CROSS REFERENCE TO PRIOR APPLICATIONS

The subject matter of this application is related to U.S. patent application Ser. No. 13/460,091 filed Apr. 30, 2012, and U.S. patent application Ser. No. 13/540,112 filed Jul. 2, 2012, the teachings of which are incorporated herein in their entirety by reference.

The present application claims priority under 35 U.S.C. §119 to Korean Patent Application No. 10-2011-0065137 (filed on Jun. 30, 2011) which is hereby incorporated by reference in their entireties.

FIELD OF THE INVENTION

The present invention relates to user equipment connected to an external device and in particular, to controlling constituent elements of the external device connected to the user equipment.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to user equipment has been introduced. Such external device connected to the user equipment can provide data, music files, and other content stored in the mobile terminal in better performance. Furthermore, various types of external devices may be connected to the user equipment. Typically, applications installed in user equipment are not designed to produce operation results proper to an external device connected to the user equipment. Such applications may produce operation results not suitable to control or drive constituent elements of the external device or to be output through the constituent elements of the external device connected to the user equipment.

SUMMARY OF THE INVENTION

This summary is provided to introduce a selection of concepts in a simplified form that are further described below in the detailed description with reference to the drawings. This summary is not intended to identify key features or essential features of the claimed subject matter, nor is it intended to limit the scope of the claimed subject matter. Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, constituent elements of an external device connected to user equipment may be controlled by running an application tailored according to a device type of the connected external device.

In accordance with another aspect of the present invention, an application tailored for a connected external device may be determined and run in user equipment and user equipment may control constituent elements of the connected external device based on the operation results.

In accordance with an embodiment of the present invention, a method may be provided for controlling and driving constituent elements of an external device connected to user equipment. The method may include obtaining external device information from the external device when coupled to the user equipment, obtaining application information based on the obtained external device information, and running an application tailored for the external device based on the obtained application information.

The method may further include transmitting operation results produced by the tailored application to the external device, and controlling and driving constituent elements of the external device based on the operation results.

The constituent elements of the external device may include at least one of a display unit, an audio output unit, an input unit, a sensing unit, and a video processing unit, and an audio and video capturing unit.

The method may further include transmitting operation results produced by the tailored application to the external device and providing the operation results through constituent elements of the external device.

The method may include providing video data and audio data produced as the operation results of the tailored application through at least one of a display unit and an audio unit of the external device.

The external device information may include device type information and universal serial bus (USB) device information. The device type information may include information on a device type of the external device. The USB device information includes information on vender identification (VID) and product identification (PID) of the external device.

The application information may include information on whether an application is required for optimally controlling and driving constituent elements of the external device, an application type, and an address of a server for obtaining the required application.

The obtaining application information may include obtaining the application information by using an application table.

The application table includes the application information mapped to the external device information.

The obtaining external device information may include obtaining the external device information through communication between an agent of the user equipment and a manager of the external device, controlling, by the agent, in the user equipment operation associated with connection between the user equipment and the external device, and controlling, by the manager in the external device, operations of constituent elements of the external device in response to control of the user equipment when the external device is connected to the user equipment.

The obtaining external device information may include obtaining USB device information when the user equipment is connected to the external device through a USB port and obtaining the external device information using a device table stored in the user equipment. The device table includes device type information mapped to the obtained USB device information.

The method may further include determining whether an application is required for optimally controlling and driving constituent elements of the external device based on the application information and determining whether the required application is installed in the user equipment when the certain application is required.

The method may include running the required application when the required application is installed in the user equipment.

The method may include downloading the required application from a server associated with the required application using information on an address of the server, is the address included in the application information, installing the downloaded application in the user equipment, and running the downloaded application for controlling and driving the constituent elements of the external device.

In accordance with an embodiment of the present invention, user equipment may be connectable to an external device. The user equipment may include a port unit and an agent. The port unit may be configured to connect to a corresponding port unit of the external device and exchange data with the external device. The agent may be configured to obtain external device information from the external device connected to the user equipment, to obtain application information based on the obtained external device information, and to run an application tailored for the external device based on the obtained application information.

The agent may be configured to transmit operation results produced by the tailored application to the external device and to control and drive constituent elements of the external device based on the operation results.

The agent may be configured to transmit the operation results produced by the tailored application to the external device and to control constituent elements of the external device to provide the operation results through the constituent elements of the external device.

The application information may include information on whether an application is required for optimally controlling and driving constituent elements of the external device, an application type, and an address of a server for obtaining the required application. The agent may be configured to determine whether an application is required for optimally controlling and driving constituent elements of the external device based on the application information and to determine whether the required application is installed in the user equipment when the application is required, The agent may be configured to download the required application from a server associated with the required application, to install the downloaded application in the user equipment, and to run the installed application, as the required application, for controlling and driving the constituent elements of the external device connected to the user equipment.

In accordance with another embodiment of the present invention, an external device may be connectable to user equipment. The external device may be configured to provide external device information to the user equipment connected to the external device when the external device is connected to the user equipment, to receive operation results generated by an application running in the user equipment, and to include constituent elements controlled and driven based on the received operation results in response to control of the user equipment connected to the external device. The application may be installed in the user equipment for controlling and driving the constituent elements of the external device.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1A:
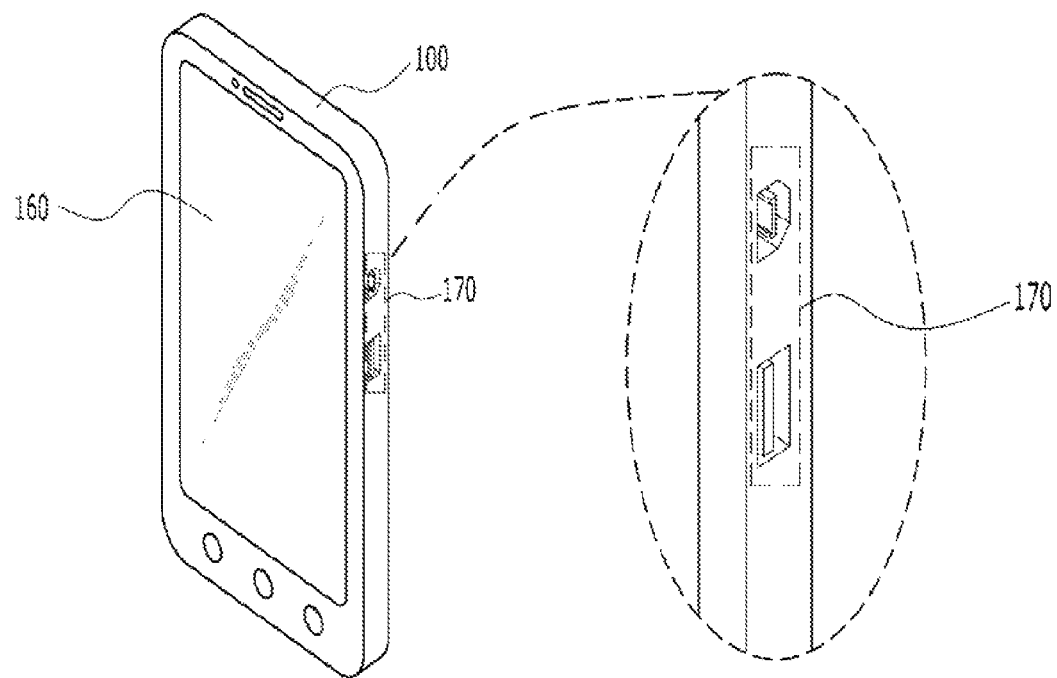
FIG. 1A shows user equipment in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1B:
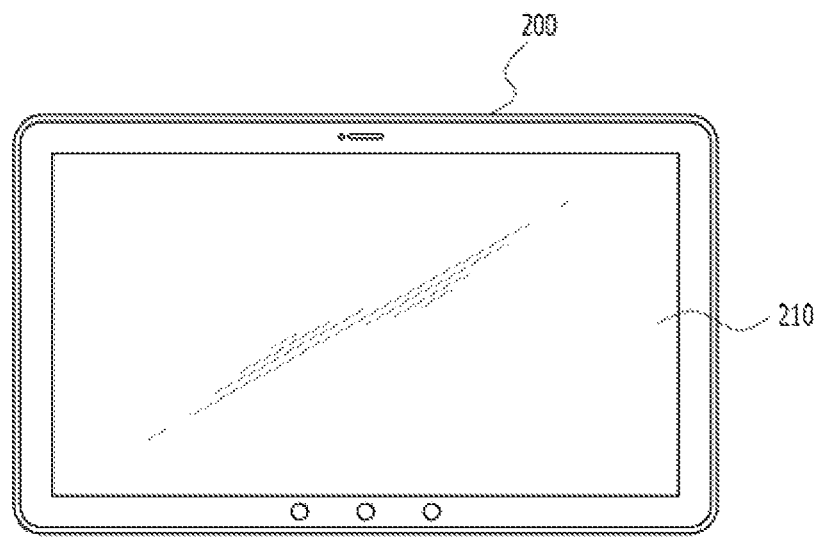
FIG. 1B shows an external device in accordance with an embodiment of the present invention.
Figure 1B:
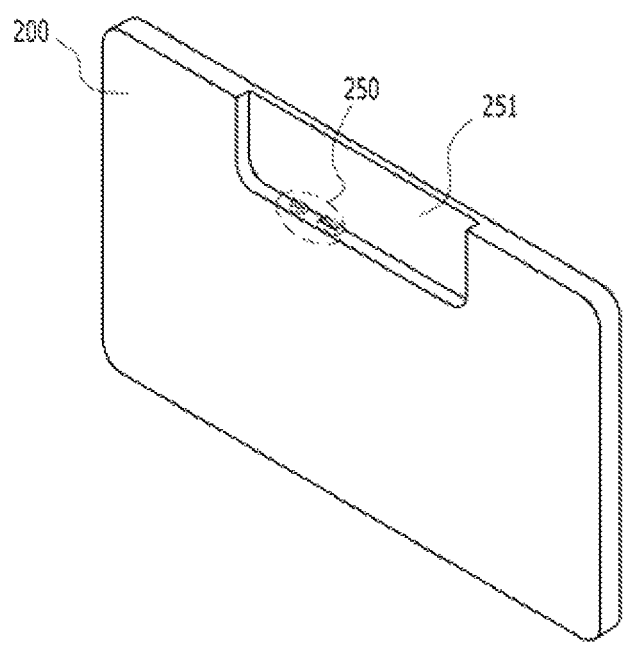

FIG. 1A shows user equipment 100 and FIG. 1B shows an external device 200 in accordance with an embodiment of the present invention.

Referring to FIG. 1A, user equipment 100 may include display unit 160 and at least one port unit 170. Display unit 160 may display data according to display setting of user equipment 100. Display unit 160 may typically have about 4.5 inch display area which is smaller than that of external device 200 (FIG. 1B), but the present invention is not limited thereto. For example, a display area of external device 200 may be smaller than that of user equipment 100. At least one port unit 170 may be coupled to external device 200 and exchange data. User equipment 100 may be capable of processing data, displaying the processed data on display unit 160, and transferring the processed data to an external device through port unit 170. Particularly, user equipment 100 may process image data corresponding to a display setting of display unit 160 and display the processed image data on display unit 160. In accordance with an embodiment of the present invention, user equipment 100 may be capable of i) adjusting the processed image data according to a display setting of external device 200, ii) transferring the adjusted image data to external device 200 through the at least one port unit 170, and ii) controlling the display unit of external device to display the adjusted image data. As described above, user equipment 100 may include at least one port unit 170. Such a port unit 170 may include a high definition multimedia interface (HDMI) port and/or a universal serial bus (USB) port, but the present invention is not limited thereto. User equipment 100 may have a certain design or standardized interface connectable to external device 200. For example, user equipment 100 may be attachable to and/or detachable with a cable or wireless radio from external device 200. User equipment 100 may dock to external device 200. User equipment 100 may be any electronic device that can perform the above and further operations described herein. For example, user equipment 100 may include, but is not limited to, a mobile terminal, a mobile device, a mobile phone, a portable terminal, a portable device, a handheld device, a cellular phone, a smart phone, a personal digital assistant (PDA), wireless local loop (WLL) station, a portable multimedia player (PMP), and a navigation device. The present invention, however, is not limited thereto, and other types of user equipment, such as mini-laptop PCs and other computing devices may incorporate embodiments of the present invention. User equipment 100 will be described in more detail with reference to FIG. 4.

As shown in FIG. 1B, external device 200 may include display unit 210 and at least one port unit 250. Display unit 210 may display data. Display unit 210 may have a display area larger than that of user equipment 100. For example, display unit 210 may have about 10.1 inch of display area. The present invention, however, is not limited thereto. External device 200 may have a display area smaller than that of user equipment 100. At least one port unit 250 may be coupled to corresponding port unit 170 of user equipment 100 for exchanging data with user equipment 100. Accordingly, at least one port unit 250 may include a HDMI port and/or a USB port corresponding to port unit 170 of user equipment 100. External device 200 may be capable of receiving data from user equipment 100 through at least one port unit 250 and displaying the received data on display unit 210. External device 200 may have a certain design connectable to user equipment 100 through at least one port unit 250. For example, external device 200 may be attachable to and/or detachable from user equipment 100 as described above with respect to FIG. 1A. External device 200 may have a structure for receiving and holding user equipment 100. Such a structure may be referred to as coupling bay 251. External device 200 may be any electronic device that can perform the above operation. For example, external device 200 may include a notebook computer, a laptop computer, a tablet PC, a pad having a touch screen, and a pad having a display unit and a keyboard, but the present invention is not limited thereto. In accordance with an embodiment of the present invention, external device 200 may be activated when user equipment 100 is connected to external device 200 and controlled by user equipment 100. Accordingly, external device 200 may have at least constituent elements for necessary operation performed under the control of user equipment 100.

As described above, user equipment 100 may be coupled to external device 200. For example, at least one port unit 170 of user equipment 100 may be coupled to at least one port unit 250 of external device 200. In accordance with an embodiment of the present invention, user equipment 100 may be coupled to external device 200 in a docking manner. Such coupling manner will be described with reference to FIG. 2.

Figure 2:
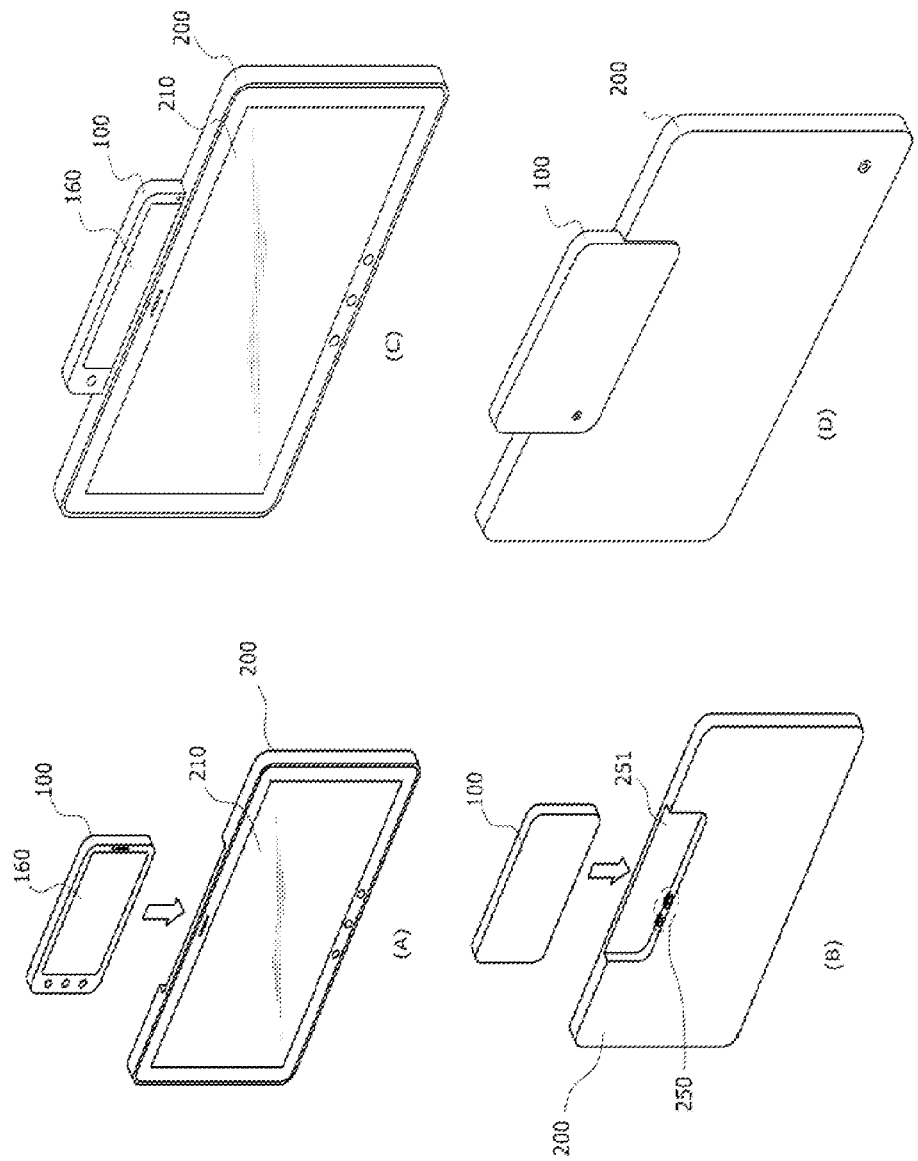
FIG. 2 shows user equipment coupled to an external device in accordance with an embodiment of the present invention.

FIG. 2 shows user equipment coupled to an external device in accordance with an embodiment of the present invention.

Referring to FIG. 2, user equipment 100 may be inserted in coupling bay 251 of external device 200 in a top-to-bottom direction as shown in a diagram (A). As shown in diagram (B), display unit 160 of user equipment 100 and display unit 210 of external device 200 may face the same direction while user equipment 100 is inserted into coupling bay 251 of external device 200. As shown in diagram (C), user equipment 100 may be completely inserted into coupling bay 251 of external device 200 until at least one port unit 170 of user equipment 100 is interlocked to at least one port unit 250 of external device 200. Although FIG. 2 shows that user equipment 100 is coupled with external device 200 in a docking manner, the present invention is not limited thereto. User equipment 100 may be coupled to external device 200 in other manners.

Figure 3:
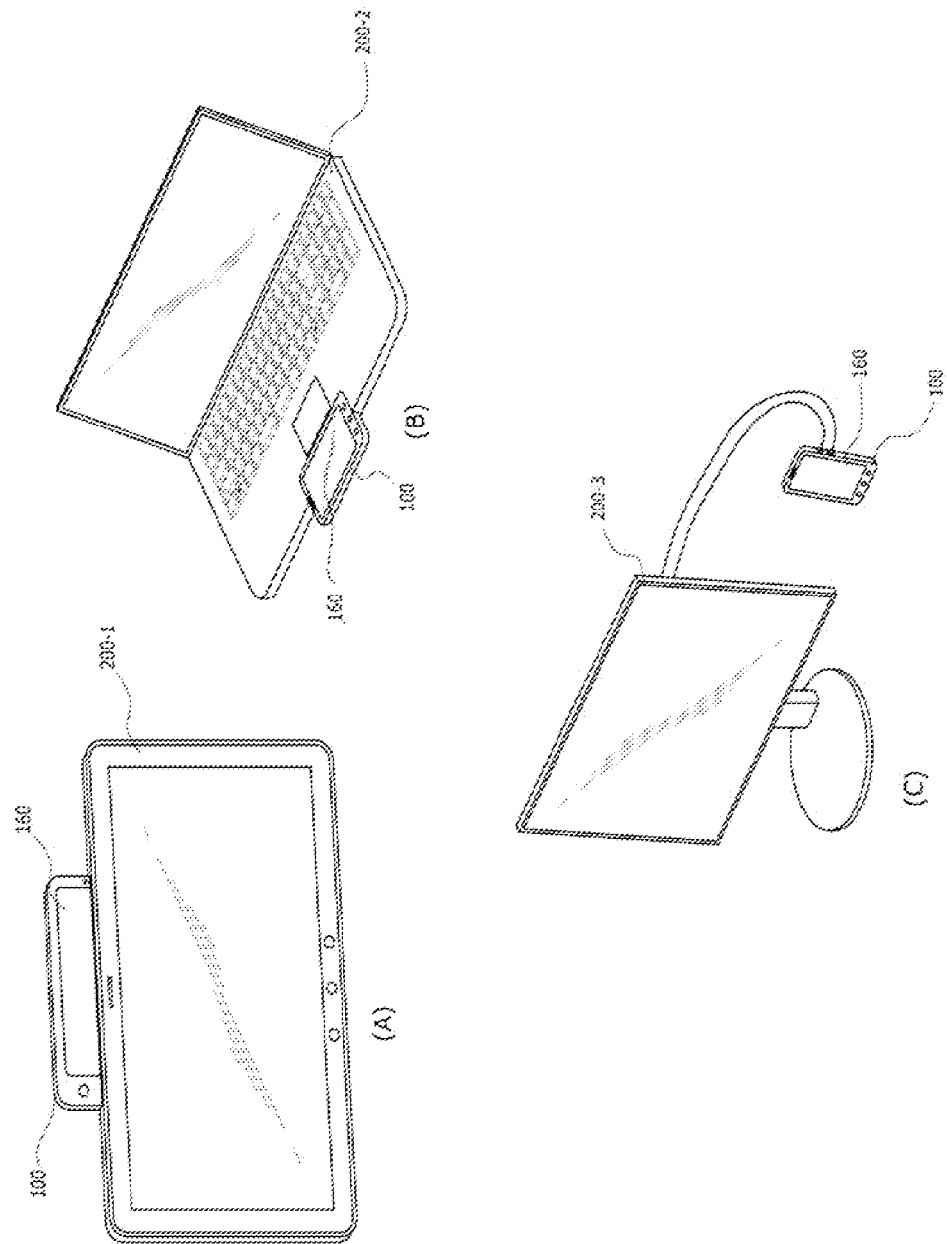
FIG. 3 shows various manner of connecting user equipment and an external device.

FIG. 3 shows various coupling manners of user equipment and various types of external devices connected to the user equipment.

Referring to FIG. 3, user equipment 100 may be coupled to a pad type device 200-1 in a docking manner as show in a diagram (A). Furthermore, user equipment 100 may be coupled to a laptop computer 200-2 in a docking manner as show in a diagram (B). User equipment 100 may be coupled to a monitor 200-3 through a physical cable as shown in a diagram (C).

As shown, user equipment 100 may be coupled to external device 200 in various manners. After user equipment 100 is coupled to external device 200, user equipment 100 may exchange data with external device 200 through port units 170 and 250. In accordance with an embodiment of the present invention, user equipment 100 may control external device 200 by exchanging data through a communication link formed between port unit 170 of user equipment 100 and port unit 250 of external device 200. Particularly, user equipment 100 may adjust image data according to a display setting of display unit 210 of external device 200, transfer the adjusted image data to external device 200 through port units 170 and 250, and control display unit 210 of external device 200 to display the adjusted image data in accordance with an embodiment of the present invention.

Furthermore, user equipment 100 may be connected to various types of external devices such as pad type external device 200-1, laptop computer 200-2, and monitor 200-3. Such external devices may also include a game device, a navigation system, and a television set (TV). Each external device may have different constituent elements with unique properties.

Hereinafter, user equipment 100 will be described in more detail with reference to FIG. 4. As described above, user equipment 100 may be coupled to various types of external devices including external device 200 and control the connected external device in accordance with an embodiment of the present invention. Particularly, user equipment 100 may determine an application tailored for optimally controlling and driving constituent elements of the connected external device and transmit the operation results of the tailored application to the connected external device in accordance with an embodiment of the present invention.

Figure 4:
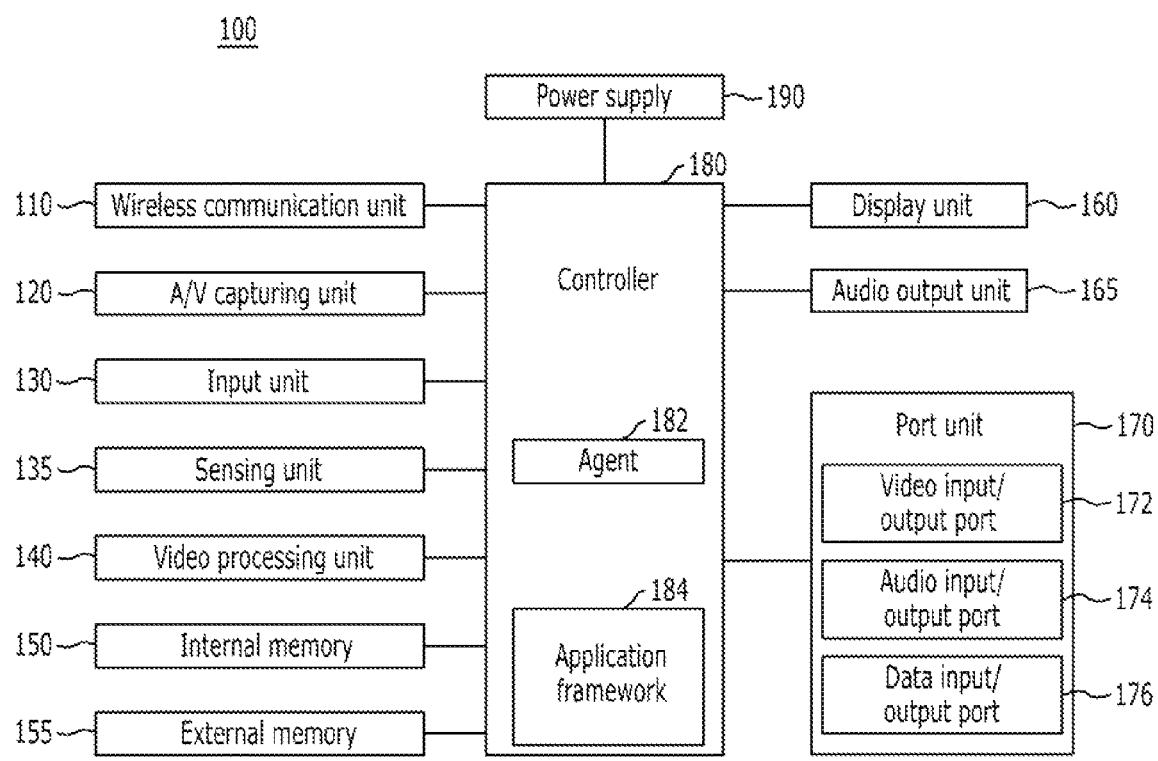
FIG. 4 shows user equipment in accordance with an embodiment of the present invention.

FIG. 4 shows an exemplary embodiment of user equipment in accordance with an embodiment of the present invention.

Referring to FIG. 4, user equipment 100 may include wireless communication unit 110, audio/video (A/V) input unit 120, input unit 130, sensing unit 135, video processing unit 140, internal memory 150, external memory 155, display unit 160, audio output unit 165, a port unit 170, a controller 180, and a power supply 190. Controller 180 may include an agent 182 and application framework 184. Port unit 170 may include video input/output port 172, audio input/output port 174, and data input/output port 176. Power supply unit 190 may include a battery for electric charging. User equipment 100 may be described as including the above constituent elements, but the present invention is not limited thereto.

Wireless communication unit 110 may include at least one module for communicating with other party through a wireless communication system. For example, wireless communication unit 110 may include any or all of a broadcasting signal receiving module, a mobile communication module, a wireless Internet module, a short-distance communication module, and a location information module. In accordance with an embodiment of the present invention, wireless communication unit 110 may be not an essential unit for user equipment 100 because user equipment 100 may be not required to communicate with another party. Accordingly, wireless communication unit 110 may be omitted in accordance with another embodiment of the present invention.

A/V capturing unit 120 may capture an audio signal and/or a video signal. For example, the A/V capturing unit 120 may include a camera and a microphone. The camera may process image frames of a still image or a moving image, which are captured by an image sensor in a video call mode or a photographing mode. The microphone may receive an audio signal provided externally in an on-call mode, a recording mode, or a voice recognition mode.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto.

Sensing unit 135 may detect a current status of user equipment 100. For example, sensing unit 135 may sense an opening or closing of a cover of user equipment 100, a location and a bearing of user equipment 100, acceleration and deceleration of user equipment 100, or physical contact with or proximity to a user. Based on the detected status of user equipment 100, sensing unit 135 may generate a sensing signal to control the operation of user equipment 100. For example, in the case of a mobile phone having a sliding type cover, sensing unit 135 may sense whether a cover is opened or closed. Sensing unit 135 may sense whether or not power supply 190 supplies power. Furthermore, sensing unit 135 may sense whether or not port unit 170 is coupled to external device 200. In this case, sensing unit 135 may receive a detection signal from port unit 170 when user equipment 100 is connected to external device 200 in accordance with an embodiment of the present invention. For example, sensing unit 135 may receive a detection signal from a hot plug detect (HPD) pin when port unit 170 includes a HDMI port. Based on the detection signal, controller 160 may determine that external device 200 is connected to user equipment 100. Upon the receipt of such signal, user equipment 100 may initiate interrupting displaying image data on display unit 160 and starting displaying the image data on external device 200. Such operation is described subsequently with reference to FIG. 9 to FIG. 15.

Video processing unit 140 may process an image signal and/or image data under the control of controller 160. Particularly, video processing unit 140 may process image data according to a display setting determined based on display unit information of display unit 160. The display setting may include a screen size, a screen resolution, a display direction, and a dot per inch (DPI) value. The display setting may be determined by controller 180 based on display unit information of display unit 160. The display unit information may include a manufacturer, a model number, a device identifier (ID), a DPI value, a screen size, the number of pixels, supporting screen resolutions, supporting aspect ratios, refresh rates, and a response time. Video processing unit 140 may transmit the processed image data to display unit 160 of user equipment 100 in response to controller 160. Furthermore, video processing unit 140 may process image data to be transmitted to external device 200 when user equipment 100 is connected to external device 200. For example, video processing unit 140 may, reconfigure image data based on a display setting of external device 200 and generate a signal based on the reconfigured image data in response to controller 180. The present invention, however, is not limited thereto. Such an operation may be performed by controller 160. The image data may be data for displaying a graphic user interface produced by any software programs installed in user equipment 100, such as an operating system and applications installed in user equipment 100.

Figure 8:
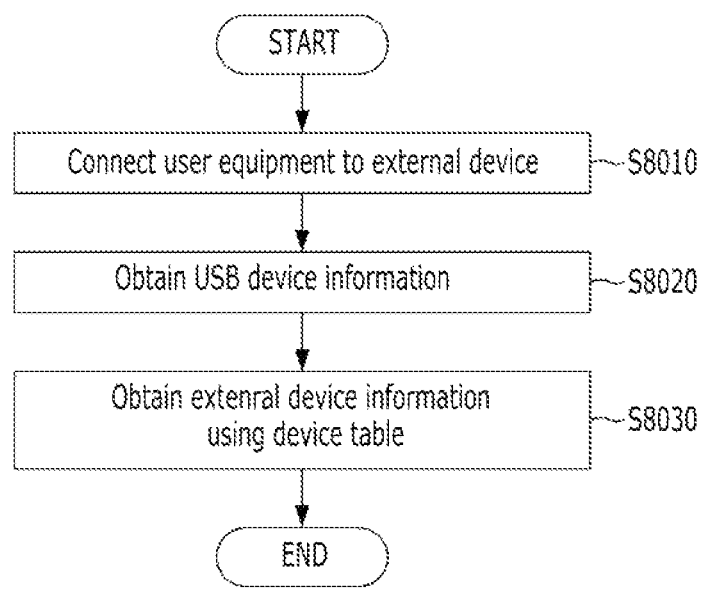
FIG. 8 shows a method for identifying a device type of an external device connected to user equipment in accordance with another embodiment of the present invention.

Internal memory 150 and external memory 155 may be used as a data storage device of user equipment 100. For example, internal memory 150 and external memory 155 may store information necessary for operating user equipment 100 and performing certain operations requested by a user. Such information may include any software programs and related data. For example, internal memory 150 and external memory 155 may store an operation system data, applications, and related data, received from an external device through a physical cable and downloaded from a related server from through a communication link. In accordance with an embodiment of the present invention, internal memory 150 and/or external memory 155 may store information on display setting determined for display unit 160 or display unit 210 of external device 200. Furthermore, internal memory 150 and external memory 155 may store device unit information for candidate external devices connectable to user equipment 100. In addition, internal memory 150 and/or external memory 150 may store a DPI table 800 as shown in FIG. 8. Internal memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. External memory 155 may be a SD card or a USB memory, but the present invention is not limited thereto. For example, external device 200 may function as external memory 155 when external device 200 is coupled to user equipment 100 in accordance with an embodiment of the present invention.

In accordance with embodiment of the present invention, at least one of internal memory 150 and external memory 155 may store external device information received from the connected external device, for example, external device 200. The external device information may include device type information and universal serial bus (USB) device information. The device type information includes information on a device type of the connected external device and the USB device information may include information on vender identification (VID) and product identification (PID) of the external device.

Furthermore, internal memory 150 and external memory 155 may store a device table and application information. The device table may include device type information mapped to USB device information. The device table may be used to obtain the external device information. The application information may include information on whether an application is required for optimally controlling and driving constituent elements of the external device, an application type, and an address of a server for obtaining the required application. The application information may be used to determine an application required for controlling constituent element of the connected external device such as external device 200.

Display unit 160 may be an output device for visually displaying information. For example, display unit 160 may display image data produced or processed by video processing unit 140 and/or controller 180. Display unit 160 may receive the image data from at least one of video processing unit 140 and controller 180 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as "App". Also, the image data may further include still images and moving images, produced or processed by video processing unit 140 and controller 180. For example, display unit 160 may be a liquid crystal display (LCD) panel or an active-matrix organic light-emitting diode (AMOLED) panel, but the present invention is not limited thereto.

In accordance with an embodiment of the present invention, display unit 160 may be interrupted to display the image data when user equipment 100 is connected to external device 200. For example, display unit 160 may be turned off or transit to a sleep mode in response to controller 180 when user equipment 100 is connected to external device 200. Display unit 160 may be turned on again or transit back to an operation mode in response to controller 180 when user equipment 100 is disconnected from external device 200.

Audio output unit 165 may provide an output audio signal that may be produced or processed by controller 180 as a result of operations performed by an operating system and/or applications installed in user equipment 100. Audio output unit 165 may include a speaker, a receiver, and a buzzer.

Port unit 170 may include at least one port for exchanging signals and/or data with external device 200. In accordance with an embodiment of the present invention, port unit 170 may transfer image data and audio data from user equipment 100 to external device 200. Port unit 170 may exchange control data with external device 200. Port unit 170 may be coupled to corresponding port unit 250 of external device 200 in various coupling manners. For example, port unit 170 may be coupled to corresponding port unit 250 of external device 200 through a physical cable. Furthermore, port unit 170 may be directly interlocked with corresponding port unit 250 of external device 200. The present invention, however, is not limited thereto. Port unit 170 may be coupled to corresponding port unit 250 of external device 200 through a radio link formed between user equipment 100 and external device 200. In this case, port unit 170 and port unit 250 may include a wireless signal transmitter and receiver ("transceiver", not shown in the FIGs.) for communicating with each other using a predetermined communication protocol. Such communication protocol may be Bluetooth® or WiFi, for example, but the present invention is not limited thereto.

As shown in FIG. 4, port unit 170 may include video input/output port 172, audio input/output port 174, and data input/output port 176, but the present invention is not limited thereto. Such port unit 170 may be embodied in various types. For example, port unit 170 may not include audio input/output interface 174. Further, port unit 170 may include a power port (not shown). In this case, the power port may transfer power from external device 200 to user equipment 100 when external device 200 is coupled to user equipment 100.

Figure 6:
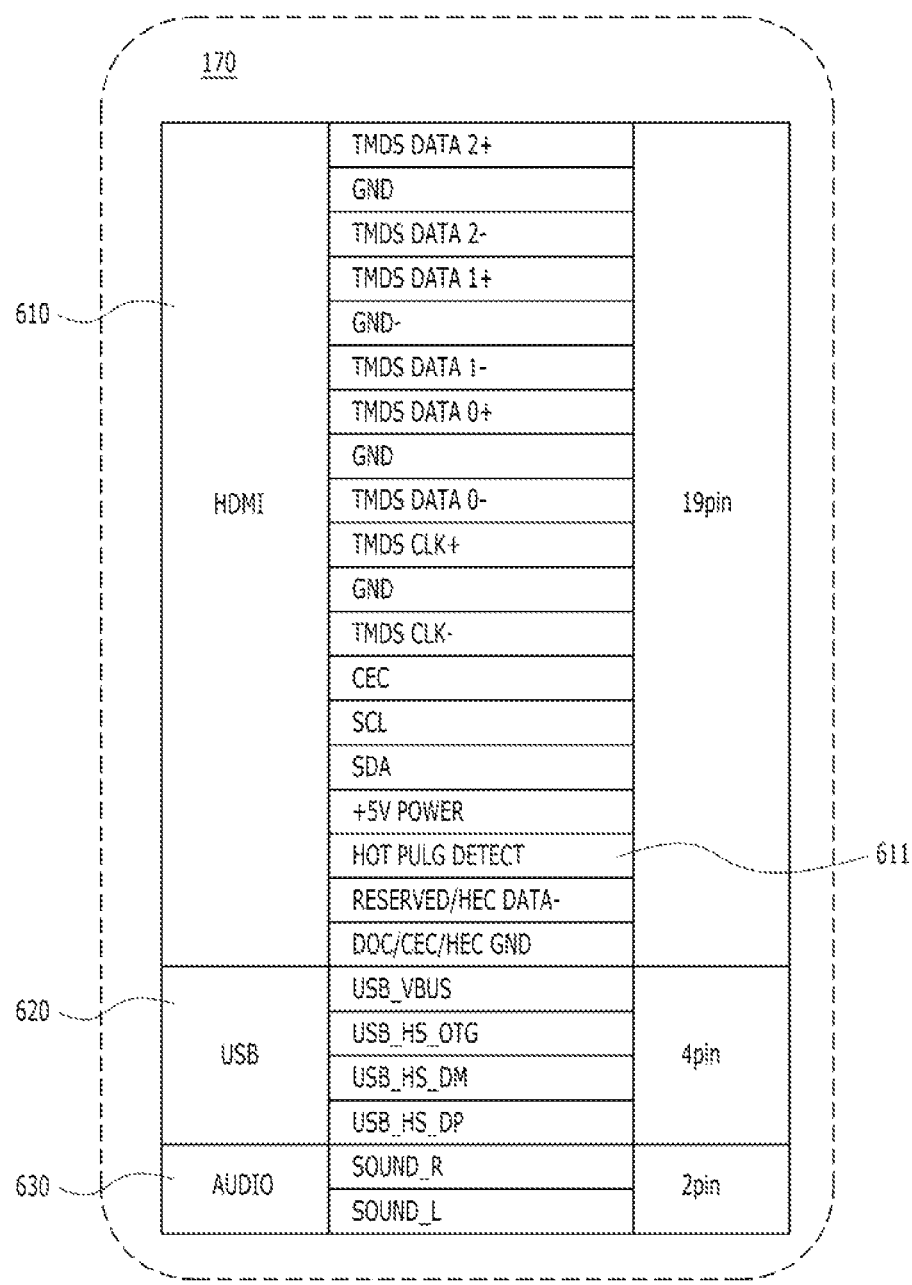
FIG. 6 shows a port unit of user equipment in accordance with an embodiment of the present invention.

Port unit 170 is described subsequently with reference to FIG. 6. Referring to FIG. 6, port unit 170 may be an interface for inputting and outputting audio and video signals and control signals. Port unit 170 may include high definition multimedia interface (HDMI) port 610, universal serial bus (USB) port 620, and audio port 630. For example, video input/output port 172 may be HDMI port 610, audio input/output port 174 may be audio port 630, and data input/output pot 176 may be USB port 620 (see FIG. 6). The present invention, however, is not limited thereto. In other embodiments of the present invention, port unit 170 may include other types of connectors and ports.

In accordance with an embodiment of the present invention, user equipment 100 may be coupled to external device 200 through port unit 170. After user equipment 100 coupled to external device 200, user equipment 100 may control external device 200 by exchanging data with external device 200 through port unit 170. For example, user equipment 100 may receive inputs from a user through external device 170 and transmit control data to external device 170 through port unit 170. Particularly, user equipment 100 may transmit image data through port unit 170 to external device 200 and control external device 200 to display the image data such a graphic user interface instead of display unit 160 of user equipment 100. Furthermore, user equipment 100 may transmit, through port unit 160, operation results of an application tailored for optimally controlling and driving constituent elements of connected external device 200.

Returning to FIG. 4, controller 180 may control overall operation of the constituent elements of user equipment 100. Particularly, controller 180 may perform operations necessary for driving the constituent elements of user equipment 100 in response to inputs received from a related user. In accordance with an embodiment of the present invention, controller 180 may control overall operation of constituent elements of external device 200 when user equipment 100 is connected to external device 200. For example, controller 180 may receive inputs through external device 200, perform an operation in response to the received inputs, and provide the user with the result thereof through external device 200. Particularly, controller 180 may display image data, as a result of operation related to the user inputs, on a display unit of external device 200 when user equipment 100 is connected to external device 200.

In order to control external device 200 when user equipment 100 is connected to external device 200, controller 180 may include agent 182. Agent 182 may control operations related to connection to external device 200 and controlling external device 200. Such agent 182 may be referred to as a coupling agent or a docking agent, but the present invention is not limited thereto. Agent 182 may be implemented in software. For example, agent 182 may be realized on an application layer in an operating system (OS) structure of user equipment 100. For example, such an OS structure may be an OS structure of an Android operating system, but present invention is not limited thereto.

Agent 182 may also determine an application required for optimally controlling and driving constituent elements of external device 200. In order to determine, agent 182 may obtain external device information from external device 200. Based on the obtained external device information, agent 182 may determine whether any application required for optimally controlling the constituent elements of external device 200 and determine whether the required application is installed in user equipment 100. Agent 182 may download the required application from an associated server when the required application is not installed in user equipment 100. Such operations of agent 182 will be described in detail with reference to FIG. 7 to FIG. 9 in later.

Furthermore, controller 180 may include application framework 184. Application framework 184 may be an application framework layer of the OS structure and implemented in software. In accordance with an embodiment of the present invention, application framework 184 may perform operations for controlling a display setting in response to associated applications producing image data when user equipment 100 is connected to external device 200. Application framework 184 may cooperate with agent 182 for controlling constituent elements of external device 200.

As described above, user equipment 100 may be connected to external device 200 and control external device 200 through running an application that produces relatively optimal operation results tailored for external device 200 connected to user equipment 100 in accordance with embodiments of the present invention. External device 200 may perform operation under the control of user equipment 100 after it is connected to user equipment 100. Particularly, external device 200 may receive the operation results of the application running in user equipment 100. External device 200 may be controlled based on the received operation results or output the received operation results. Hereinafter, external device 200 will be described with reference to FIG. 5.

Figure 5:
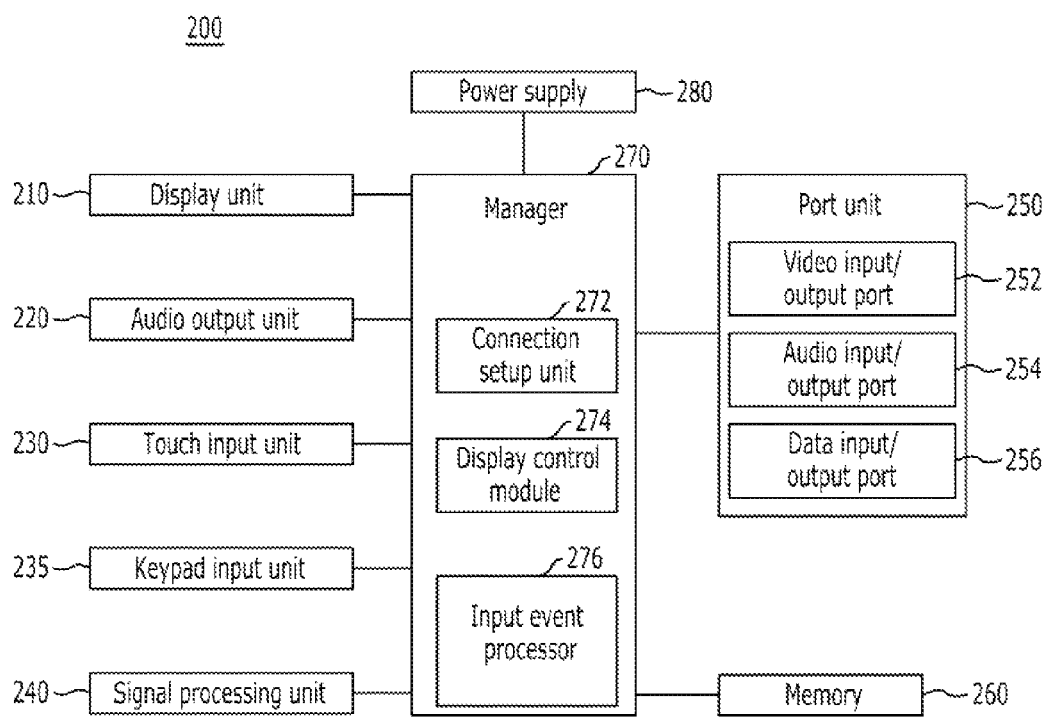
FIG. 5 is a block diagram illustrating external device in accordance with an embodiment of the present invention.

FIG. 5 shows an external device in accordance with an embodiment of the present invention.

Referring to FIG. 5, external device 200 may include display unit 210, audio output unit 220, touch input unit 230, keypad input unit 235, signal processing unit 240, port unit 250, memory unit 260, manager 270, and power supply 280. Display unit 210, audio output unit 220, touch input unit 230, keypad input unit 235, memory unit 260, and power supply unit 280 may be analogous to, and perform similar functions to, display unit 160, audio output unit 165, input unit 130, internal memory unit 150, and power supply unit 190 of user equipment 100. Accordingly, the detailed description thereof will be omitted herein. For convenience and ease of understanding, only constituent elements performing distinct operations are described.

Port unit 250 may be connected to port unit 170 of user equipment 100. That is, port unit 250 may be a connecting port for forming connectivity between user equipment 100 and external device 200. Accordingly, port unit 250 may be a pair relation with port unit 170 of user equipment 100. Port unit 250 may have the same interface configuration of that of port unit 170 of user equipment 100. For example, port unit 250 may have a HDMI port, a USB port, and an audio port.

Port unit 250 may include video input/output port 252, audio input/output port 254, and data input/output port 256. Video input/output port 252 may receive image data from user equipment 100. Audio input/output port 254 may receive audio signals. Data input/output port 256 may exchange data with user equipment 100. Furthermore, port unit 250 may include a power port (not shown) for transferring power to user equipment 100 and a sensing port (not shown) for sensing connection formed between user equipment 100 and external device 200. The present invention, however, is not limited thereto. For example, port unit 250 may be connected to user equipment 100 through a radio link formed between user equipment 100 and external device 200. In this case, port unit 250 may include a signal transmitter and receiver (not shown) for communicating with each other using a communication protocol. Such communication protocol may be Bluetooth® or WiFi, for example, but the present invention is not limited thereto.

Referring back to FIG. 2, external device 200 may include coupling bay 251 in accordance with an embodiment of the present invention. Port unit 250 may be disposed on one side of coupling bay 251. Coupling bay 251 may be formed at a part of a rear side of external device 200. Coupling bay 215 may have a space for housing user equipment 100. User equipment 100 may be inserted into coupling bay 215. In accordance with an embodiment of the present invention, port unit 170 of user equipment 100 may be connected with port unit 250 of user equipment 200 when user equipment 100 is completely inserted into coupling bay 251.

Manager 270 may control overall operation for controlling constituent elements of external device 200 in response to user equipment 100 when external device 200 is coupled to user equipment 100. In accordance with an embodiment of the present invention, manager 270 may receive control data from user equipment 100 through port unit 250 and perform operation in response to the control data. Furthermore, manager 270 may receive inputs from a related user and transmit the received input to user equipment 100 through port unit 250.

Furthermore manager 270 may provide external device information to user equipment 100 when external device 200 is connected to user equipment 100. The external device information may include at least one of device type information and USB device information. User equipment 100 may identify a device type of external device 200 based on the external device information and run an application determined based on the device type of external device 200. Such application may produce operation results optimized for constituent elements of external device 200. Manager 270 may receive such operation results from user equipment 100 and control constituent elements of external device 200 based on the received operation results in accordance with embodiments of the present invention. Furthermore, manager 270 may control related constituent elements to output the received operation results in accordance with embodiments of the present invention.

Manager 270 may include connection setup unit 272, display control module 274, and input event processor 276 in accordance with an embodiment of the present invention. Connection setup unit 272 may activate the constituent elements of external device 200 when external device 200 initially senses that external device 200 is connected to user equipment 100. For example, connection setup unit 272 may supply power to the constituent elements of external device 200. That is, connection setup unit 272 may transit a waiting state of external device 200 to a wakeup state of external device 200. Accordingly, connection setup unit 272 may establish a host-device connection between user equipment 100 and external device 200.

External device 200 may provide a graphic user interface substantially identical to that displayed on user equipment 100 when external device 200 is connected to user equipment 100. In such a connected state, image data displayed on display unit 160 of user equipment 100 may be transferred to and displayed on display unit 210 of external device 200. In order to display the transferred image data on display unit 210, manager 270 may include display control module 274. Display control module 274 may turn on display unit 210 under control of manager 270 when external device 200 is connected to user equipment 100. Then, manager 274 may receive the image data displayed on display unit 160 of user equipment 100 from user equipment 100 and display the received image data on display unit 210 of external device 200.

When touch input unit 230 and keypad input unit 235 of external device 200 receive input events such as a touch input in a connected state, input event processing unit 276 may generate an event signal corresponding to the input events and transfer the generated event signal to user equipment 100. The generated event signal may be a signal for controlling operation of user equipment 100 corresponding to the received input events.

In accordance with an embodiment of the present invention, external device 200 may not operate in a disconnected state. The disconnected state may denote a state that user equipment 100 is not connected to external device 200. Accordingly, external device 200 may be a dummy device. In this case, external device 200 may include minimum elements for performing essential functions such as display control and touch input control.

As described above, external device 200 may be connected to user equipment 100 and perform operations under the control of user equipment 100 based on operation results of an application tailored for external device 200 in accordance with an embodiment of the present invention. Such operation may be performed by exchanging data through port units 170 and 250. Such port units 170 and 250 may be illustrated in FIG. 6. For convenience and ease of understanding, port unit 170 is representatively shown in FIG. 6.

FIG. 6 shows a port unit of user equipment in accordance with an embodiment of the present invention.

Referring to FIG. 6, port unit 170 of user equipment 100 may include HDMI port 610, USB port 620, and audio port 630. HDMI port 610 may include 19 pins for exchanging signals designated to each pin. For example, HDMI port 610 may include hot plug detect (HPD) pin 611. HPD pin 611 may generate a detection signal when user equipment 100 is connected to external device 200. Based on the detection signal generated by HPD pin 611, user equipment 100 may determine that user equipment 100 is connected to external device 200. HDMI port 610 may mainly exchange image data with external device 200. USB port 620 may include 4 pins for mainly exchanging data with external device 200. Furthermore, audio port 630 may include 2 pins for exchanging audio data with external device 200. Although FIG. 6 shows port unit 170 having HDMI port 610, USB port 620, and audio port 630 to connect user equipment 100 with external device 200, the present invention is not limited thereto.

In accordance with an embodiment of the present invention, user equipment 100 is coupled with external device 200 shown in FIG. 5 though port unit 170 provided therein. The present invention, however, is not limited thereto. For example, user equipment 100 may be coupled to other electronic devices or appliances such as TV and computer monitors having such HDMI port and/or USB port to output audio/video signals thereto.

As described above, user equipment 100 may be connected various types of external devices such as a game device, a navigation system, and a television set in accordance with embodiments of the present invention. After user equipment 100 is connected to external device 200, user equipment 100 may use constituent elements of external device 200 to receive user inputs and to output operation results in response to the received user inputs. Applications installed in user equipment 100 may perform operations and produce results, which are relatively optimally tailored to a processing environment of user equipment 100. Accordingly, when user equipment 100 runs such applications in response to the received user inputs and outputs the operation results of the applications through constituent elements of external device 200 connected to user equipment 100, the applications may not produce results optimally tailored to a processing environment of external device 200. In order to overcome such drawbacks, applications may be selected corresponding to a device type of external device 200 connected to user equipment 100 and the selected application may run to produce results optimally tailored to the processing environment of external device 200 connected to user equipment 100 in accordance with embodiment of the present invention. Hereinafter, such operation will be described with reference to FIG. 7 to FIG. 9. For convenience and ease of understanding, a method for identifying a device type of an external device in accordance with embodiments of the present invention will be described as user equipment 100 is connected to external device 200 through a HDMI port and a USB port. The present invention, however, is not limited thereto.

Figure 7:
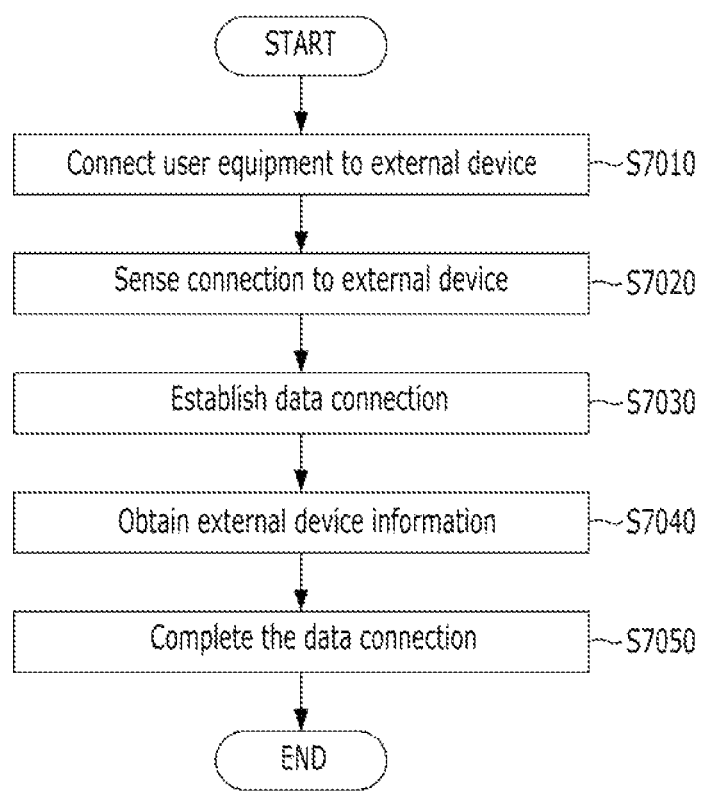
FIG. 7 shows a method for identifying a device type of an external device when the external device includes a manager in accordance with an embodiment of the present invention.

FIG. 7 and FIG. 8 show a method for identifying a device type of an external device connected to user equipment in accordance with embodiments of the present invention. Particularly, FIG. 7 shows a method for identifying a device type of an external device when the external device includes a manager in accordance with an embodiment of the present invention. External device 200 may include manager 270 as shown in FIG. 5. That is, external device 200 may be designed to be connected to user equipment 100. In order to control operations related to connection to user equipment 100, external device 270 may include manager 270. That is, manager 270 may control overall operation for controlling constituent elements of external device 200 in response to user equipment 100 when external device 200 is coupled to user equipment 100. Furthermore, manager 270 may receive control data from user equipment 100 through port unit 250 and perform operation in response to the control data. Manager 270 may receive inputs from a related user and transmit the received input to user equipment 100 through port unit 250. When external device 200 includes manager 270, user equipment 100 may obtain external device information as follows in accordance with embodiments of the present invention.

Referring to FIG. 7, user equipment 100 may be connected to the external device 200 at step S7010. For example, user equipment 100 may be physically connected to external device 200 through HDMI port 610, as video input/output ports 172 and 252, and USB port 620, as data input/output ports 176 and 256.

At step S7020, user equipment 100 may sense the physical connection to external device 200. For example, agent 182 of user equipment 100 may receive a detection signal such as hot plug detect (HPD) signal through HPD pin 611 of HDMI port 610 when user equipment 100 is physically connected to external device 200. Accordingly, user equipment 100 may recognize that the physical connection is established to external device 200 upon the receipt of the HPD signal. For another example, agent 182 of user equipment 100 may communicate with external device 200 through USB port 610. Particularly, agent 182 of user equipment 100 may receive a detection signal during communicating with external device 200 through a USB net and/or android debug bridge (ADB) when user equipment 100 is connected to external device 200. As described above, agent 182 may receive a certain detection signal through hardware from external device 200 or by communicating with external device 200 when user equipment 100 is connected to external device 200. Accordingly, agent 182 may identify the physical connection to external device 200.

After establishing the physical connection, agent 182 of user equipment 100 may inactive constituent elements of user equipment 100 in accordance with embodiments of the present invention. For example, agent 182 may inactive display unit 160, audio output unit 165, and/or input unit 130. Particularly, agent 182 may turn off display unit 160 or put display unit 160 into a sleep mode. Instead of using the constituent elements of user equipment 100, agent 182 may control constituent elements of external device 200 connected to user equipment 100. For example, agent 182 may control display unit 210 and audio output unit 220 of external device 200 to display video and/or audio data processed in user equipment 100 and control touch input unit 230 and keypad input unit 235 to receive user inputs in accordance with embodiments of the present invention. In order to control the constituent elements of external device 200, agent 182 may switch a control path for controlling constituent elements in accordance with embodiments of the present invention. The control path may include a command control path for generating and transferring a command to constituent elements and an event control path for receiving and transferring events generated in related constituent elements. The present invention, however, is not limited thereto. Such inactivation of constituent elements may be omitted in another embodiment of the present invention. For example, processing results may be output not only through constituent elements of user equipment 100 but also through constituent elements of external device 200 in accordance with another embodiment of the present invention.

At step S7030, a data connection may be established between user equipment 100 and external device 200. For example, agent 182 of user equipment 100 and manager 270 of external device 200 may exchange information for establishing the data connection. In order to exchange the information, a connection negotiation start message and/or a connection negotiation start acknowledgment (ACK) message may be exchanged between agent 182 and manager 270.

At step S7040, agent 182 may obtain external device information from manager 270 of external device 200 while establishing the data connection. The external device information may include information on external device 200 connected to user equipment 100. For example, the external device information may include device type information and USB device information. The device type information may include information on a device type of external device 200. The USB device information may include a vender ID (VID) and a product ID (PID) of a USB device.

At step S7050, the completed data connection may be established between user equipment 100 and external device 200. For example, agent 182 of user equipment 100 and manager 270 of external device 200 may exchange a connection completion message and a connection completion ACK message after completely establishing the data connection.

As described above, agent 182 user equipment 100 may obtain the external device information from manager 270 of external device 200 connected to user equipment 100 in accordance with embodiments of the present invention. Such external device 200 having manager 270 may be a device particularly designed to be connected user equipment 100 in order to provide better performance in outputting video and audio data. Typical devices such as a laptop computer, a game device, and/or a monitor may exclude manager 270 unlike external device 200. Hereinafter, a method for identifying a device type of an external device excluding a manager when it is connected to user equipment 100 in accordance with embodiments of the present invention will be described with reference to FIG. 8.

FIG. 8 shows a method for identifying a device type of an external device connected to user equipment in accordance with another embodiment of the present invention. As described above, the external device may exclude manager 270 unlike user equipment 100.

Referring to FIG. 8, user equipment 100 may be connected to an external device at step S8010. For example, user equipment 100 may be physically connected to the external device through HDMI port 610 and USB port 620.

At step S8020, agent 182 of user equipment 100 may obtain USB device information from the external device using USB port 620. For example, a typical external device may include USB device information. USB device information may be information on a device type and identification of corresponding device. Particularly, the USB information may include a VID and a PID of a corresponding device. After user equipment 100 is connected the external device through USB port 620, user equipment 100 may be enabled to communicate with the external device. Agent 182 of user equipment 100 may obtain the USB device information from the external device through communication.

At step S8030, agent 182 may obtain external device information using a device table. The device table may include device type information mapped to the USB device information. User equipment 100 may store the device table in a memory. The device table may be updated from a server of a manufacturer associated with a corresponding external device. Table 1 shows an exemplary device table in accordance with embodiments of the present invention, but the present invention is not limited thereto.

TABLE 1

| USB device information | | Device type information |
|---|---|---|
| VID = A | PID = 1 | First type game device manufactured by Q company |
| VID = B | PID = 2 | Second type game device manufactured by P company |
| ... | ... | ... |

As described above, the external device may be various types of devices such as a navigation system, a game device, and an e-Book device. As shown in Table 1, a device type of the external device may be determined based on the USB device information obtained from the external device. For example, the obtained USB device has a VID of A and/or a PID of 1, the external device may be a first type game device manufactured by the Q company. Based on the device type of the external device, user equipment 100 may select an application that can produce operation results tailored to the external device connected to user equipment 100. Hereinafter, a method for determining and running an application generating operation results tailored to an external device connected to user equipment in accordance with embodiment of the present invention is described with reference to FIG. 9.

Figure 9:
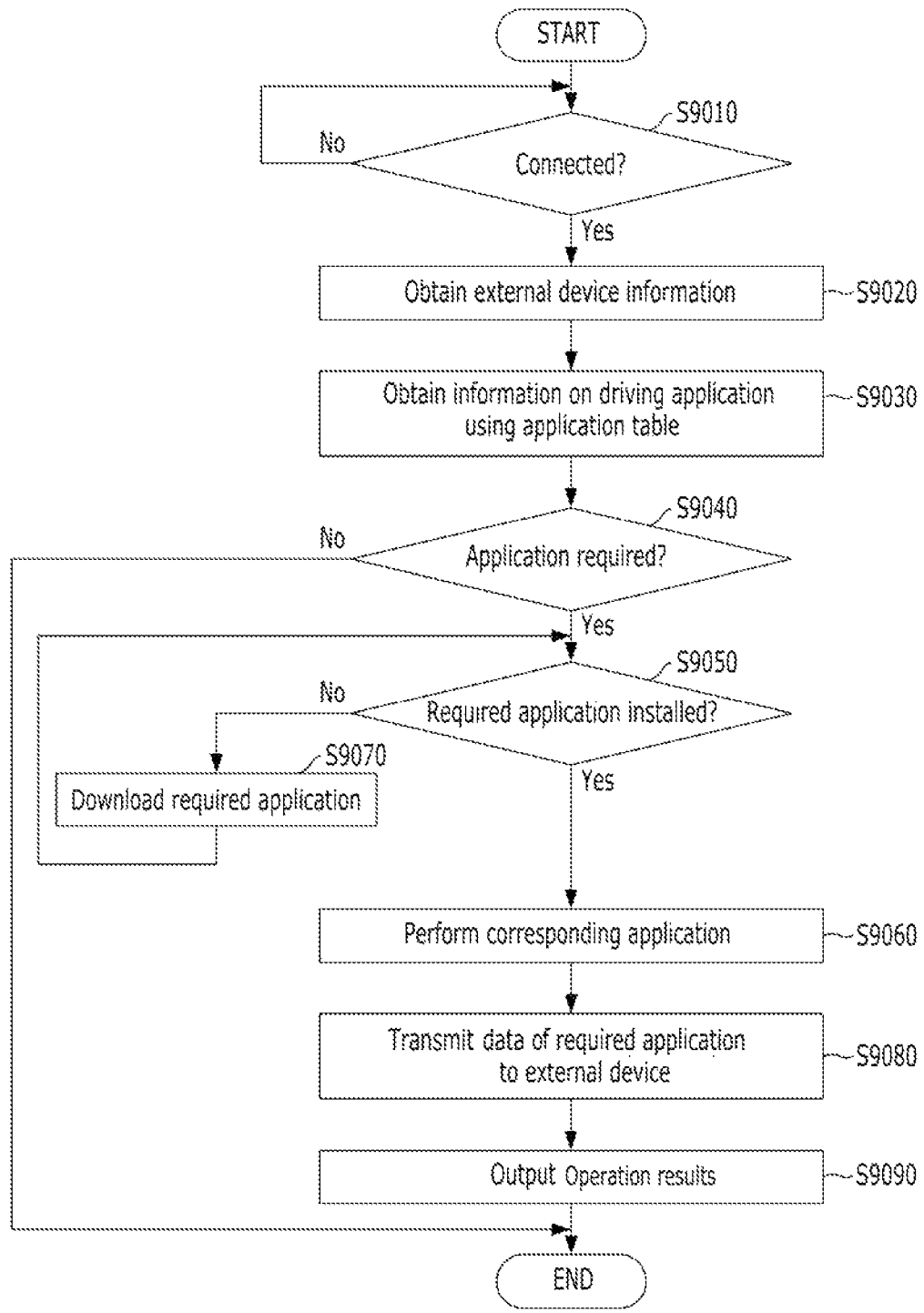
FIG. 9 shows a method for running an application corresponding to a device type of external device in accordance with embodiments of the present invention.

FIG. 9 shows a method for running an application corresponding to a device type of external device in accordance with embodiments of the present invention.

Referring to FIG. 9, determination may be made as to whether user equipment 100 is connected to external device 200. For example, user equipment 100 may detect that user equipment 100 is connected to external device 200 at step S9010. Since detecting the physical connection to external device 200 was described previously with reference to FIG. 7 and FIG. 8, the detailed description thereof is omitted herein.

When user equipment 100 is connected to external device 200 (Yes—S9010), user equipment 100 may establish data connection and obtain external device information from external device 200 at step S9020. The external device information may include information on external device 200 connected to user equipment 100. For example, the external device information may include device type information and USB device information. The device type information may include information on a device type of external device 200. The USB device information may include a vender ID (VID) and a product ID (PID) of a USB device.

As described above, after user equipment 100 is connected to external device 200, user equipment 100 may control constituent elements of external device 200 instead of controlling constituent elements of user equipment 100. User equipment 100 may control and drive the constituent elements of external device 200 connected to user equipment 200 based on the USB device information of external device 200. The method for obtaining the external device information was described previously with reference to FIG. 7 and FIG. 8. Accordingly, detailed description thereof is omitted.

At step S9030, user equipment 100 may obtain application information using an application table. For example, the application table may include application information mapped to device types. The application information may include information on applications tailored for controlling and driving constituent elements of external device 200 connected to user equipment 100 and producing operation results relatively optimized for constituent elements of external device in accordance with embodiments of the present invention. Such applications may preferably produce operation results tailored to the characteristics of external device 200. The application information may include information on whether a driving application is required to control and to drive a connected device, an application type, and an address of a server for downloading the required driving application.

In accordance with embodiments of the present invention, user equipment 100 may determine, based on the application information, whether an application is required for controlling and driving constituent elements of external device 200, determine an application type corresponding to external device 200, and an address of a service for downloading related applications. The download server address may be an address of a server of a manufacturer of external device 200 or an address of an application marker server where the required application is available.

For example, table 2 shows an exemplary application table in accordance with embodiments of the present invention. The present invention, however, is not limited thereto.

TABLE 2

| Device type | Application information | |
|---|---|---|
| | Application type | Download server address |
| First device | Application 1 | Server URL 1 |
| Second device | Application 2 | Server URL 2 |
| Third device | Not required | Not available |
| ... | ... | ... |

As shown in Table 2, the application information may be mapped to drive types. Accordingly, based on the device type, corresponding application information may be obtained. For example, when a device has a first device type, user equipment 100 may determine that application 1 is required and the application 1 can be downloaded from a server having an address of "Server URL1."

At step S9040, determination may be made as to whether an application is required corresponding to external device 200 connected to user equipment 100 based on the application table. For example, user equipment 100 may determine whether a certain application is required corresponding to external device using the application table.

When the certain application is not required (No—S9040), user equipment 100 may run applications installed in user equipment 100 and output the results of the applications through constituent elements of external device 200. That is, external device 200 may not require running any specific application tailored to external device 200 for user equipment 100 to control or to drive the constituent elements of external device 200. Furthermore, user equipment 100 may not need specific application to produce operation results tailored for external device 200 in order to output the operation results through constituent elements of external device 200.

When the certain application is required (Yes—S9040), determination may be made as to whether the required application is installed or not when the certain application is required at step S9050. For example, when certain application is required based on the application table, user equipment 100 may determine whether the required application is installed or not.

When the required application is not installed in user equipment 100 (No—S9070), the required application may be downloaded from a related server and installed in user equipment 100 at step S9070. For example, the address of the related server may be obtained from the application information, the related server may be accessed, and the required application may be downloaded from the related server in accordance with embodiments of the present invention. The downloaded application may be installed in user equipment 100.

When the required application is installed in user equipment 100 (Yes—S9050), the required application may be run at step S9060. For example, user equipment 100 may run the required application when the required application is installed. Accordingly, user equipment 100 may properly control and drive constituent elements of external device 200 and output operation results optimally using constituent elements of external device 200 through the required application tailored to external device 200 in accordance with embodiments of the present invention.

At step S9080, operation results may be transmitted to external device 200 through port units. For example, user equipment 100 may transmit the operation results of the required application, such as video and/or audio data, to external device 200 through HDMI port 610 and USB port 620.

At step S9090, operation results may be output through constituent elements of external device 200. For example, display unit 210 and audio output unit 230 may output the received operation result of the required application. Since the required application may be tailored for constituent elements of external device 200 connected to user equipment 100 in order to produce optimized operation results, a graphic user interface may be displayed on display unit 210 and audio data may be output through audio output unit 220 with optimized performance.

Although not shown in FIG. 9, user equipment 100 may still output the operation results through constituent elements of user equipment 100, such as display unit 160 and audio output unit 165. Such exception may be applied when user equipment 100 includes display unit 160 and/or audio output unit 165 having a larger screen size and/or a better speaker performance. For example, when user equipment 100 is a laptop computer and external device 200 is a portable game device, user equipment 100 may have a larger screen size than external device 200.

When user equipment 100 is disconnected from external device 200, user equipment 100 may detect such disconnection through a disconnection signal generated in hardware or through communication with external device 200. For example, when external device 200 does not response to a certain message for a predetermined time, user equipment 100 may detect the disconnection. Furthermore, agent 182 of user equipment 100 and manager 270 of external device 200 may detect disconnection by exchanging certain messages. When external device 200 excludes manager 270, user equipment 100 may detect disconnection by monitoring a state of USB port 620.

When user equipment 100 detects such disconnection, user equipment 100 may interrupt running the required applications for external device 200 and may run another application tailored for user equipment 100, which corresponds to the required applications for external device 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling and driving constituent elements of an external device connected to user equipment, in the user equipment, the method comprising:
   obtaining external device information associated with the external device from the external device when coupled to the user equipment, wherein the external device information includes device type information;
   obtaining application information corresponding to the obtained external device information, using an application table stored in the user equipment, wherein (i) the application table includes a mapping relationship between external device types and the application information, and (ii) the application information includes information on whether an application is required for optimally controlling and driving constituent elements of the external device, an application type of the required application, and an address of a server for obtaining the required application;
   determining whether the required application is installed in the user equipment when the application is required for optimally controlling and driving the constituent elements of the external device;
   running an installed application as an application tailored for the external device when the required application is installed in the user equipment; and
   running an application downloaded using a corresponding server address obtained from the application table, as the tailored application when the required application is not installed in the user equipment.

2. The method of claim 1, further comprising:
   transmitting operation results produced by the tailored application to the external device; and
   controlling and driving constituent elements of the external device based on the operation results.

3. The method of claim 2, wherein the constituent elements of the external device include at least one of a display unit, an audio output unit, an input unit, a sensing unit, and a video processing unit, and an audio and video capturing unit.

4. The method of claim 1, further comprising:
transmitting operation results produced by the tailored application to the external device; and
providing the operation results through constituent elements of the external device.

5. The method of claim 4, comprising:
providing video data and audio data produced as the operation results of the tailored application through at least one of a display unit and an audio unit of the external device.

6. The method of claim 1, wherein:
the external device information further includes universal serial bus (USB) device information;
the device type information includes information on a device type of the external device; and
the USB device information includes information on vender identification (VID) and product identification (PID) of the external device.

7. The method of claim 1, wherein the obtaining external device information includes:
obtaining the external device information through communication between an agent of the user equipment and a manager of the external device;
controlling, by the agent, in the user equipment operation associated with connection between the user equipment and the external device; and
controlling, by the manager in the external device, operations of constituent elements of the external device in response to control of the user equipment when the external device is connected to the user equipment.

8. The method of claim 1, wherein the obtaining external device information includes:
obtaining USB device information when the user equipment is connected to the external device through a USB port; and
obtaining the external device information using a device table stored in the user equipment,
wherein:
the device table includes the device type information mapped to the obtained USB device information.

9. The method of claim 1, wherein the running an application downloaded includes:
downloading the required application from a server associated with the required application using information on an address of the server, is the address included in the application information;
installing the downloaded application in the user equipment; and
running the downloaded application for controlling and driving the constituent elements of the external device.

10. User equipment connectable to an external device, the user equipment comprising:
a port unit configured to:
connect to a corresponding port unit of the external device, and
exchange data with the external device; and
an agent configured to:
obtain external device information associated with the external device connected to the user equipment, from the external device,
obtain application information corresponding to the obtained external device information, using a pre-stored application table, and
perform of a running procedure of an application tailored for the external device based on the obtained application information,
wherein:
the external device information includes device type information,
the application table includes a mapping relationship between external device types and the application information, and
the application information includes information on whether an application is required for optimally controlling and driving constituent elements of the external device, an application type of the required application, and an address of a server for obtaining the required application; and
wherein the running procedure includes:
determining whether the required application is installed in the user equipment when the application is required for optimally controlling and driving the constituent elements of the external device,
running an installed application as the application tailored for the external device when the required application is installed in the user equipment, and
running an application downloaded using a corresponding server address obtained from the application table, as the tailored application when the required application is not installed in the user equipment.

11. The user equipment of claim 10, wherein the agent is configured to:
transmit operation results produced by the tailored application to the external device; and
control and drive constituent elements of the external device based on the operation results.

12. The user equipment of claim 10, wherein the agent is configured to:
transmit the operation results produced by the tailored application to the external device; and
control constituent elements of the external device to provide the operation results through the constituent elements of the external device.

13. An external device connectable to user equipment, the external device configured to:
provide external device information to the user equipment connected to the external device when the external device is connected to the user equipment;
receive operation results generated by an application running in the user equipment; and
include constituent elements controlled and driven based on the received operation results in response to control of the user equipment connected to the external device,
wherein:
the external device information includes at least one of device type information and universal serial bus (USB) device information associated with the external device, and
the application is installed in the user equipment for controlling and driving the constituent elements of the external device; and
wherein the user equipment is configured to:
obtain application information corresponding to the obtained external device information, using an application table stored in the user equipment, wherein (i) the application table includes a mapping relationship between external device types and the application information, and (ii) the application information includes information on whether an application is required for optimally controlling and driving constituent elements of the external device, an application type of the required application, and an address of a server for obtaining the required application;

determine whether the required application is installed in the user equipment, when the application is required for optimally controlling and driving the constituent elements of the external device;

run an installed application when the required application is installed in the user equipment; and run an application downloaded using a corresponding server address obtained from the application table when the required application is not installed in the user equipment.

\* \* \* \* \*